W. N. BOOTH
DEMOUNTABLE RIM SECURING MEANS
Original Filed Nov. 24, 1919

Inventor
William N. Booth
By Whittemore, Hulbert & Whittemore
Attorneys

Patented Mar. 30, 1926.

1,579,067

UNITED STATES PATENT OFFICE.

WILLIAM N. BOOTH, OF DETROIT, MICHIGAN.

DEMOUNTABLE-RIM-SECURING MEANS.

Application filed November 24, 1919, Serial No. 340,266. Renewed August 26, 1925.

*To all whom it may concern:*

Be it known that I, WILLIAM N. BOOTH, a citizen of the United States of America, residing at Detroit, in the county of Wayne and State of Michigan, have invented certain new and useful Improvements in Demountable-Rim-Securing Means, of which the following is a specification, reference being had therein to the accompanying drawings.

The invention relates to demountable rims for vehicle wheels of that type in which the rim engages tapering seats upon the fixed rim and is secured thereto by lateral pressure of a clamping lug. It is the object of the invention to provide means for more accurately securing the rim and for avoiding defects which have existed in constructions heretofore used.

A is the wheel rim, which may be of any suitable construction, but which is shown as of the clincher type. B is a metallic fixed rim of channel cross-section, and C and C' are flanges projecting from the opposite sides of the fixed rim and forming the tapering seats for the demountable rim. The rim A is provided with bearing portions D and D' for respectively engaging the seats C and C', these bearings being preferably formed on ribs or beads on the inner side of the rim. For clamping the rim upon its seats there are provided bolts E passing transversely through the fixed rim and engaging clamping lugs F. The latter are preferably provided with heel portions G, which engage shoulders H on the inner portion of the fixed rim, and with bearing portions I for engaging the rib D'. The lugs F are actuated by nuts J, preferably secured thereto by a swivel engagement.

Figure 1:
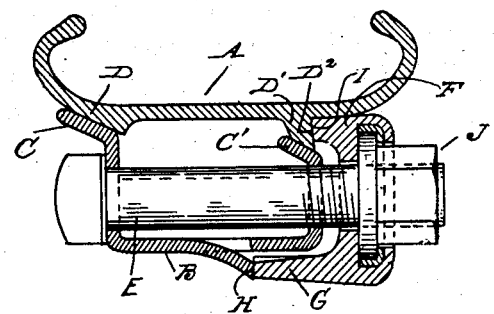
Figure 1 is a cross-section through the demountable rim and the fixed rim, showing the clamping means in sectional elevation.

With the construction as thus far described difficulty has sometimes been experienced in properly securing the demountable rim, due to the fact that commercial rims seldom exactly fit the seats upon the fixed rim. Thus, where a rim is slightly over-sized, the bearing portion I of the lug will sometimes force itself between the bearing D' and the flange C', both distorting the rim and failing to properly secure the same. I have avoided this difficulty by forming the face of the rib D', which engages the bearing I on the lug, at such an angle that clamping pressure on the lug will tend to draw the same into fuller engagement with the rim instead of sliding off the rim between the same and the flange C'. Thus, as shown in Figure 1, the face $D^2$ of the rib D' is slightly undercut or obliquely inclined and the engaging face I of the lug is correspondingly inclined. Therefore, when clamping pressure is exerted upon the lug, instead of sliding off the demountable rim and between the same and the adjacent fixed rim flange, it will be drawn into fuller engagement with the demountable rim and at the same time will exert a lateral pressure, forcing the demountable rim up the inclines and into firm engagement with the wheel.

Figure 2:
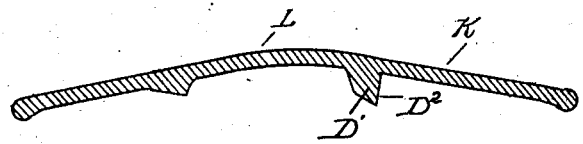
Figure 2 is a cross-section through the blank from which the rim is formed, showing the manner of constructing the same.

The undercut bearing $D^2$ may be formed on the rib D' either during the rolling of the same, or subsequently after the rim is completely formed. Thus, as shown in Figure 2, the rim blank K during its initial rolling is slightly reversely bent, as indicated at L, thereby giving draft for the face $D^2$ in the rolls. Subsequently when the blank is bent into its completed form, shown in Figure 1, the face $D^2$ will assume its undercut relation.

Figure 3:
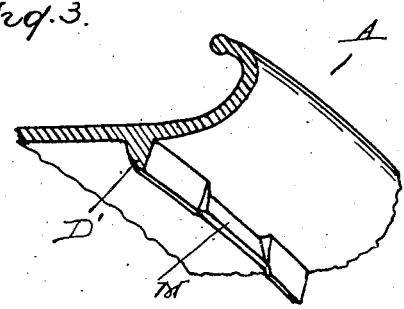
Figure 3 is a sectional perspective view showing a modified construction.

As shown in the modified construction of Figure 3, the rib or bead D' is originally reversely tapered and is subsequently refashioned in dies at points opposite the lugs to be given the undercut form, as indicated at M.

What I claim as my invention is:

1. The combination with a demountable rim, of a fixed rim having a tapered seat for said demountable rim, a circumferentially extending bead on said demountable rim, means for securing said demountable rim upon said fixed rim including clamping lugs each having a face engaging said bead to force said demountable rim to its seat, and circumferentially extending bearings on said bead for engagement with said clamping lugs, said bearings being inclined to draw the faces of said clamping lugs into fuller engagement therewith.

2. The combination with a channel shaped fixed rim having flanges on opposite sides thereof provided with tapering seats, the base of said fixed rim having a struck out portion, of a demountable rim having portions engageable with the tapering seats upon said flanges, means for securing said demountable rim upon said fixed rim including a clamping lug having a portion extending adjacent the inner face of the base of said fixed rim and adapted to fulcrum upon said struck-out portion, said clamping lug having a face engaging said demountable rim to force the same to its seat, and a bearing on said demountable rim for engaging said face, said bearing being inclined to draw said face into fuller engagement therewith.

3. The combination with a demountable rim, of a channel-shaped fixed rim having flanges on opposite sides thereof provided with tapering seats for said demountable rim, a circumferential bead extending inwardly from said demountable rim for engaging one of said tapering seats, means for securing said demountable rim upon said fixed rim including a clamping lug having a face engaging said demountable rim to force the same to its seat, and a circumferentially extending bearing on said bead for engaging said face, said bearing being inclined to draw said face into fuller engagement therewith.

In testimony whereof I affix my signature.

WILLIAM N. BOOTH.